US009063540B2

(12) United States Patent
Seberger

(10) Patent No.: US 9,063,540 B2
(45) Date of Patent: *Jun. 23, 2015

(54) METHODS AND APPARATUS TO LIMIT A CHANGE OF A DRIVE VALUE IN AN ELECTRO-PNEUMATIC CONTROLLER

(71) Applicant: FISHER CONTROLS INTERNATIONAL LLC, Marshalltown, IA (US)

(72) Inventor: Stephen George Seberger, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/654,091

(22) Filed: Oct. 17, 2012

(65) Prior Publication Data

US 2013/0041481 A1 Feb. 14, 2013

Related U.S. Application Data

(63) Continuation of application No. 12/419,822, filed on Apr. 7, 2009, now Pat. No. 8,306,637.

(51) Int. Cl.
*G05B 13/02* (2006.01)
*G05B 19/44* (2006.01)
*G05D 3/20* (2006.01)

(52) U.S. Cl.
CPC ...... *G05B 19/44* (2013.01); *G05B 2219/31119* (2013.01); *G05B 2219/37536* (2013.01); *G05B 2219/41304* (2013.01);
(Continued)

(58) Field of Classification Search
CPC .................. H02P 6/10; G05B 13/042
USPC .............. 700/28, 33, 80; 702/82; 318/400.19
See application file for complete search history.

(56) References Cited

U.S. PATENT DOCUMENTS 5,270,916 A * 12/1993 Sexton et al. ................... 700/41
5,493,488 A    2/1996 Castle et al.
(Continued)

FOREIGN PATENT DOCUMENTS

EP        0867362       9/1998
JP       2002123302     4/2002
(Continued)

OTHER PUBLICATIONS

"International Search Report", issued in by the International Searching Authority on Sep. 30, 2010, in connection with International Application No. PCT/US2010/028756, (3 pages).
(Continued)

*Primary Examiner* — Mohammad Ali
*Assistant Examiner* — Sheela S Rao
(74) *Attorney, Agent, or Firm* — Hanley, Flight & Zimmerman LLC

(57) ABSTRACT

Example methods and apparatus to limit a change of a drive value in an electro-pneumatic controller are disclosed. A disclosed example method includes determining a slew limit of a controller based on noise in at least one of a control signal or a feedback signal, calculating a drive value based on the control signal and the feedback signal, and changing the calculated drive value if a difference between the drive value and a previous drive value is greater than the slew limit of the controller.

22 Claims, 8 Drawing Sheets

(52) U.S. Cl.
CPC .............. *G05B 2219/41333* (2013.01); *G05B 2219/45006* (2013.01); *G05D 3/20* (2013.01)

(56) References Cited

U.S. PATENT DOCUMENTS

| | | | |
|---|---|---|---|
| 6,003,811 | A | 12/1999 | Trikha |
| 6,267,349 | B1 | 7/2001 | Gomes et al. |
| 7,130,721 | B2 | 10/2006 | Wear et al. |
| 7,222,016 | B2 | 5/2007 | Snowbarger et al. |
| 7,755,313 | B2 | 7/2010 | Son et al. |

FOREIGN PATENT DOCUMENTS

| | | |
|---|---|---|
| JP | 2003343503 | 12/2003 |
| JP | 4008088 | 11/2007 |
| JP | 2008294015 | 12/2008 |
| SU | 1078487 | 3/1984 |
| WO | 2006045032 | 4/2006 |
| WO | 2008070864 | 6/2008 |

OTHER PUBLICATIONS

"Written Opinion of the International Searching Authority", issued by the International Searching Authority on Sep. 30, 2012, in connection with International Application No. PCT/US2010/028756, (5 pages).

United States Patent and Trademark Office, "Office action", issued in connection with U.S. Appl. No. 12/419,822, Dec. 21, 2011, (23 pages).

United States Patent and Trademark Office, "Notice of Allowance", issued in connection with U.S. Appl. No. 12/419,822, Jun. 22, 2012, (18 pages).

The State Intellectual Property Office of the People'S Republic of China, "Office Action", issued in connection with corresponding Chinese Patent Application No. 201080019937.3 dated Sep. 16, 2013 (20 pages).

Japanese Patent Office, "Notice of Reasons for Refusal", issued in connection with corresponding Japanese Patent Application No. 2012-504703, mailed on Jan. 15, 2014 (4 pages).

Machine Translation from JPO/INPIT of H11-231906, Aug. 27, 1999 (6 pages). *Please note—this was assembled from multiple separate sections using the tool and is not necessarily in the same order as in the reference.

Federal Service for Intellectual Property, Russian Federation, "Inquiry under the substantive examination," issued in connection with Russian Application No. 2011141736/08(062476), Jun. 10, 2014, 9 pages.

Notification of the Second Office Action, issued by the State Intellectual Property Office of the P.R. China, in connection with Chinese Patent Application No. 201080019937.3, on Jul. 31, 2014, 11 pages.

Examination Report, issued by the Patent Office of the Cooperation Council for the Arab States of the Gulf, in connection with Application No. GC2010-15612 on Oct. 21, 2014, 4 pages.

Notification of the First Office Action, English Language, issued by the State Intellectual Property Office of the P.R. China, in connection with Chinese Patent Application No. 201320811166.2, on Mar. 7, 2014, 3 pages.

European Office Action, issued by the European Patent Office in connection with European Patent Application 13179505.6, on Oct. 1, 2014, 6 pages.

Decision of Refusal, English Language, issued by the Japanese Intellectual Property Office in connection with Japanese Patent Application No. 2012-504703, on Aug. 27, 2014, 5 pages.

International Search Report, issued by the International Searching Authority in connection with International patent application No. PCT/US2013/065359, mailed on Jun. 18, 2014, 2 pages.

Written Opinion, issued by the International Searching Authority in connection with International patent application No. PCT/US2013/065359, mailed on Jun. 18, 2014, 5 pages.

International Preliminary Report on Patentability, issued by the International Searching Authority in connection with International patent application No. PCT/US2013/065359 mailed on Apr. 30, 2015, 7 pages.

\* cited by examiner

METHODS AND APPARATUS TO LIMIT A CHANGE OF A DRIVE VALUE IN AN ELECTRO-PNEUMATIC CONTROLLER

FIELD OF DISCLOSURE

The present disclosure relates generally to controllers and, more particularly, to methods and apparatus to limit a change of a drive value in an electro-pneumatic controller.

BACKGROUND

Electronic control devices (e.g., an electro-pneumatic controller, programmable controllers, analog control circuits, etc.) are typically used to control process control devices (e.g., control valves, pumps, dampers, etc.). These electronic control devices cause a specified operation of the process control devices. For purposes of safety, cost efficiency, and reliability, many well-known diaphragm-type or piston-type pneumatic actuators are used to actuate process control devices and are typically coupled to the overall process control system via an electro-pneumatic controller. Electro-pneumatic controllers are usually configured to receive one or more control signals and convert those control signals into a pressure provided to a pneumatic actuator to cause a desired operation of the process control device coupled to the pneumatic actuator. For example, if a process control routine requires a pneumatically-actuated valve to pass a greater volume of a process fluid, the magnitude of the control signal applied to an electro-pneumatic controller associated with the valve may be increased (e.g., from 10 milliamps (mA) to 15 mA in a case where the electro-pneumatic controller is configured to receive a 4-20 mA control signal).

Electro-pneumatic controllers typically use a feedback signal generated by a feedback sensing system or element (e.g., a position sensor) that senses or detects an operational response of a pneumatically-actuated control device. For example, in the case of a pneumatically-actuated valve, the feedback signal may correspond to the position of the valve as measured or determined by a position sensor. The electro-pneumatic controller compares the feedback signal to a desired set-point or control signal and utilizes a position control process to generate a drive value based on (e.g., a difference between) the feedback signal and the control signal. This drive value corresponds to a pressure to be provided to the pneumatic actuator to achieve a desired operation of the control device (e.g., a desired position of a valve) coupled to the pneumatic actuator.

SUMMARY

Example methods and apparatus to limit a change of a drive value in an electro-pneumatic controller are described. An example method includes determining a slew limit of a controller based on noise in at least one of a control signal or a feedback signal, calculating a drive value based on the control signal and the feedback signal, and changing the calculated drive value if a difference between the drive value and a previous drive value is greater than the slew limit of the controller.

A disclosed example apparatus includes a noise detector and a drive current slew limiter. The example noise detector is to identify noise in at least one of a control signal or a feedback signal. The example drive slew limiter is to determine a slew limit based on the noise, receive a drive value and a previous drive value, and change the drive value if a difference between the drive value and the previous drive value is greater than the slew limit.

DETAILED DESCRIPTION

Figure 1:
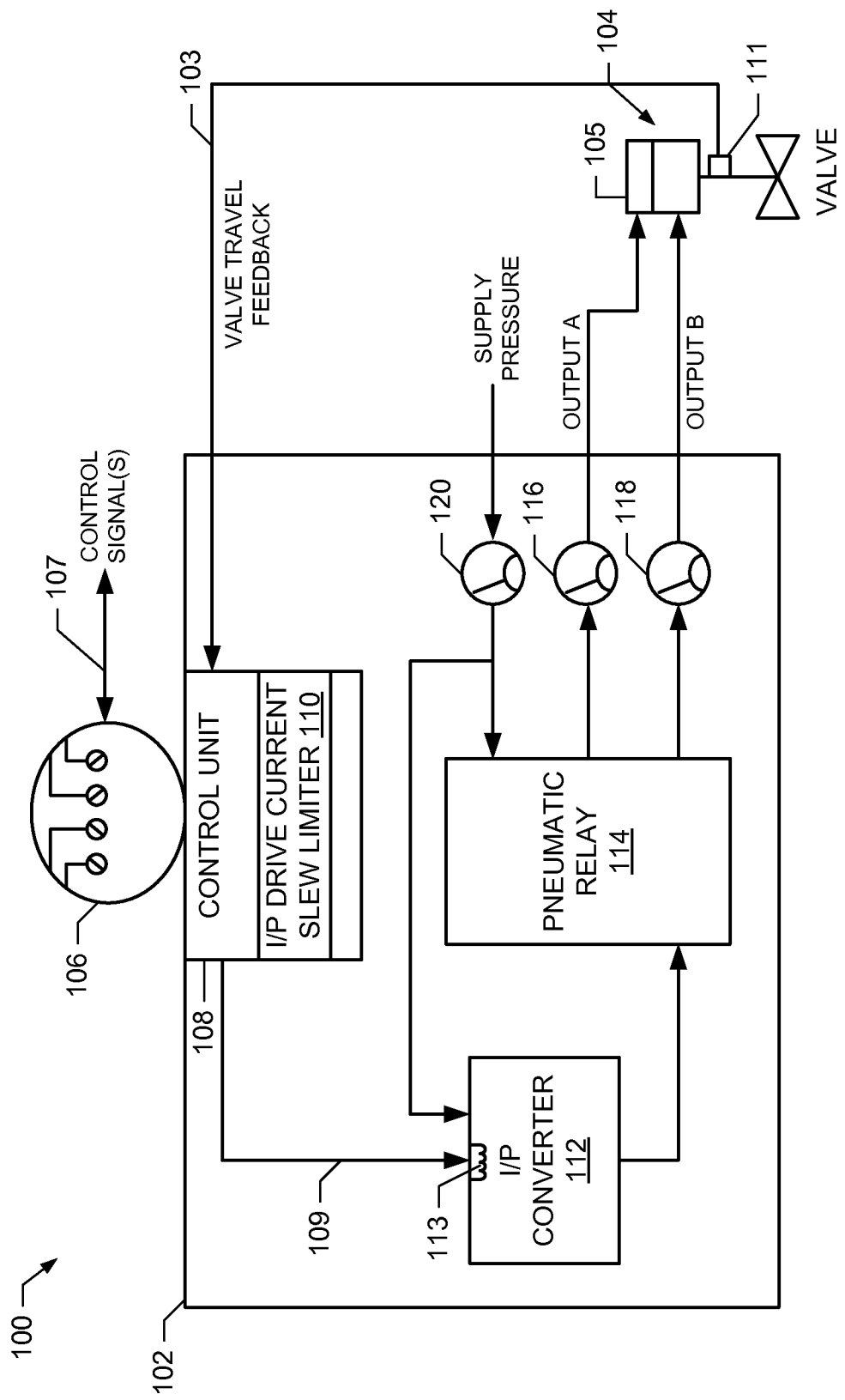
FIG. 1 is a diagram of an example control valve assembly including an example valve controller and valve.

Although the following describes example methods and apparatus including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example methods and apparatus, the examples provided are not the only way to implement such methods and apparatus.

The performance of a position control process can be adversely affected by a high inductance of a coil winding (e.g., a solenoid winding) within an electro-pneumatic controller. Specifically, this high inductance may limit the rate at which the electrical current in the electro-pneumatic controller solenoid or winding can be increased due to characteristics of the power supply driving the winding. However, when the current is decreased through the solenoid or winding, the rate of decrease may be limited by a zener diode that may be used to set the clamp voltage of the solenoid or winding rather than allowing other characteristics of the current control circuit to limit the decrease. The voltage is typically clamped at a level greater than power supply voltage, which enables the current to decrease at a faster rate than the rate at which the current is increased.

As a result of the difference between the rates at which the electrical current can be increased and decreased in the winding or the solenoid, the electro-pneumatic controller exhibits an asymmetric control response that, in some conditions, causes the average solenoid current to vary or deviate (e.g., become offset) relative to the commanded solenoid current or drive value provided by the position control process. In other words, the high inductance of the winding or solenoid in the electro-pneumatic controller results in an overall slew limit for the electro-pneumatic controller that is defined by the rate at which current in the winding or solenoid can be increased. The lower slew limit associated with increasing winding or solenoid current relative to the slew rate associated with decreasing winding or solenoid current results in an asymmetric control response for the electro-pneumatic controller. This asymmetric control response of the electro-pneumatic controller may, in some conditions, ultimately result in a degradation of the position control accuracy of the pneumatic actuator coupled to the electro-pneumatic controller.

Furthermore, the position control process can be adversely affected by noise within a feedback signal and/or a control signal. For example, noise that causes drive value calculations to exceed 100% but not to fall below 0%, or when the drive value exceeds both limits by an asymmetric amount, the actual average drive value output is different than the average calculated drive value. This difference results in a shift in the effective output of the position control process, resulting in position control error at the pneumatic actuator and the control device.

The example methods and apparatus described herein may be used to correct an asymmetric control response of an electro-pneumatic controller, such as a valve controller, due to high inductance in a solenoid or winding of an electro-pneumatic controller and/or due to noise within a feedback signal and/or a control signal. More generally, the example methods and apparatus described herein may be used to correct an asymmetrical control response of an electro-pneumatic controller due to, for example, electro-pneumatic controller operational limitations (e.g., difficulty driving inductive loads), valve operational limitations, high frequency system noise, environmental noise, and/or control latency.

An electro-pneumatic controller typically includes a control unit that provides a current to an electro-pneumatic converter such as a current-to-pneumatic (I/P) converter. The control unit calculates a drive signal based on a control signal and a feedback signal. The control signal corresponds to a specified setpoint for a control device (e.g., a valve) and the feedback signal corresponds to a position and/or a pressure of the control device. The difference or error signal between the control signal and the feedback signal corresponds to a drive value (e.g., a voltage) that is used to cause the I/P converter to move an actuator coupled to the control device to achieve the specified setpoint. More specifically, the control unit uses the drive value to generate and/or control a current through the solenoid or winding in the I/P converter, which generates a pneumatic pressure based on the magnitude of the current. The pneumatic pressure may then be amplified and used to actuate the control device (e.g., the valve).

The I/P converter functions as a transducer to convert a current into a pneumatic pressure via a solenoid (e.g., a high impedance winding or inductor). The solenoid magnetically controls a flapper that operates relative to a nozzle to vary a flow restriction through the nozzle/flapper to provide a pneumatic pressure that varies based on the average current through the solenoid. The high inductive impedance of the solenoid and the characteristics of the power supply applied to the solenoid limit the rate (i.e., defines a slew rate) at which the current through the solenoid within the I/P converter can be increased. However, the high impedance does not similarly limit the rate at which the current is decreased, as noted above, due to a higher clamped voltage on the side of the solenoid opposite the power supply. This difference in the rates at which the current can be increased or decreased creates an asymmetric control limitation such that if the control unit calculates a current increase, the high inductance limitations of the I/P converter limit the rate (i.e., define a slew limit) which, if not considered in the position control process of the electro-pneumatic converter, results in a disparity between the calculated current in the solenoid as desired by the position control process and the actual current in the solenoid. This disparity or difference results in decreased accuracy in the position control of, for example, a pneumatic actuator coupled to a control device such as a valve.

The example methods and apparatus described herein may be used to correct the above-noted asymmetric control response of an electro-pneumatic controller by limiting a change of a drive value in a control unit of the electro-pneumatic controller where the drive value change corresponds to a current change in the solenoid of the electro-pneumatic controller. More specifically, the example methods and apparatus described herein may be implemented by receiving a control signal and a feedback signal, calculating from the control signal and the feedback signal a drive value, and determining if a difference between the drive value and a previous drive value is greater than a slew limit of the electro-pneumatic controller. The example method and apparatus may then change the calculated drive value based on the slew limit.

The slew limit may be a predetermined value based on characteristics and/or limits of the electro-pneumatic controller, an I/P converter of the electro-pneumatic controller, and/or the control device coupled to the pneumatic actuator. The slew limit may be a single value or, alternatively, may be a function of the calculated drive value. Additionally, the slew limit may be a function of the noise (e.g., calculated noise) within the electro-pneumatic controller and/or within the feedback signal and/or the control signal.

The disclosed methods and apparatus generally relate to limiting a change of a drive value in a an electro-pneumatic controller. While the disclosed methods and apparatus are described in conjunction with examples involving a pneumatically actuated valve, the disclosed methods and apparatus may be implemented with valves actuated in other manners and/or with process control devices other than valves.

FIG. 1 is a diagram of a control valve assembly 100 including a valve controller 102 (e.g., an electro-pneumatic controller) and a valve 104 (e.g., a process control device). The valve 104 and the valve controller 102 may be physically and/or communicatively coupled together within the example control valve assembly 100. Alternatively, the valve 104 and the valve controller 102 may be separate components communicatively and/or pneumatically coupled together. In other examples, the valve controller 102 may be coupled to one or more other valves and/or the valve 104 may be coupled to one or more other valve controllers 102.

The example control valve assembly 100 includes a connector 106 coupled to the valve controller 102. The valve controller 102 receives power and control signals via the connector 106. The power and/or the control signals may be received by the connector 106 via a communication path 107. The power may be provided from an external power source, a control system, solar power, battery power, etc. Additionally, the control signals (e.g., input signals) may include, for example, a 4-20 mA signal, a 0-10 VDC signal, and/or digital commands, etc. The valve controller 102 may be configured to receive the one or more control signals from an outside source (e.g., a host system located in a control room) to which it may be communicatively coupled. The control signals specify or correspond to a valve state for the example valve 104. For example, the control signals may cause a pneumatic actuator 105 coupled to the valve 104 to be open, closed, or at some intermediate position.

The power and/or the control signals may share a single wire within the communication path 107 or, alternatively, the power and/or the control signals may be received at the connector 106 via multiple wires within the communication path 107. For example, in a case where the control signal is a 4-20 mA signal, a digital data communication protocol such as, for example, the well-known Highway Addressable Remote Transducer (HART) protocol may be used to communicate with the valve controller 102. Such digital communications may be used by an overall process control system to retrieve identification information, operation status information and diagnostic information from the valve controller 102. For example, using the HART communications protocol and a two-wire configuration, the control signal in the form of digital data is combined with the power for the valve controller 102 on a single twisted pair of wires. The power to the valve controller 102 and the digital data superimposed on a 4-20 mA analog control signal may be sent from a host system such as, for example, a host system of a control room and filtered to separate the power from the control signal. Alternatively or additionally, the digital communications may be used to control or command the valve controller 102 to perform one or more control functions.

In other examples, the control signal may be a 0-10 VDC signal. Additionally, the communication path 107 may include separate power wires or lines (e.g., 24 VDC or 24 volts alternating current (VAC)) to power the valve controller 102. In other examples, the power and/or the control signal may share wires or lines with digital data signals. For instance, a two-wire configuration may be implemented with the example controller apparatus 100 using a digital Fieldbus communications protocol, wherein digital data is combined with the power on the two-wire configuration.

Furthermore, the connector 106 may be replaced or supplemented with one or more wireless communication links. For example, the valve controller 102 may include one or more wireless transceiver units to enable the valve controller 102 to exchange control information (set-point(s), operational status information, etc.) with the overall process control system. In the case where one or more wireless transceivers are used by the valve controller 102, the power may be supplied to the valve controller 102 via, for example, wires to a local or remote power supply.

The example valve 104 includes a valve seat defining an orifice that provides a fluid flow passageway between an inlet and an outlet. The valve 104 may be, for example, a rotary valve, a quarter-turn valve, a motor-operated valve, a damper, or any other control device or apparatus. The pneumatic actuator 105 coupled to the valve 104 is operatively coupled to a flow control member via a valve stem, which moves the flow control member in a first direction (e.g., away from the valve seat) to allow fluid flow between the inlet and the outlet and in a second direction (e.g., toward the valve seat) to restrict or prevent fluid flow between the inlet and the outlet.

The actuator 105 coupled to the example valve 104 may include a double-acting piston actuator, a single-acting spring return diaphragm or piston actuator, or any other suitable actuator or process control device. To control the flow rate through the valve 104, the valve includes a feedback sensing system 111 (e.g., a position sensor, a pressure sensor, and/or a position transmitter) such as, for example, a potentiometer, a magnetic sensor array, etc. The feedback sensing system 111 detects the position of the actuator 105 and the position of the flow control member relative to the valve seat (e.g., an open position, a closed position, an intermediate position, etc.). The feedback sensing system 111 is configured to provide or generate a feedback signal such as, for example, a mechanical signal, an electrical signal, etc. to the valve controller 102 via a valve travel feedback communication path 103. The feedback signal may represent a position of the actuator 105 coupled to the valve 104 and, thus, a position of the valve 104. The pressure signal provided to the actuator 105 controls the position of the valve 104. The pressure signal may include output pressures 116 and 118.

The example valve controller 102 of FIG. 1 includes a control unit 108, an I/P drive current slew limiter 110, an I/P converter 112, and a pneumatic relay 114. In other examples, the valve controller 102 may include any other components for controlling and/or providing pressure to the valve actuator 105. Additionally or alternatively, although not shown, the control unit 108 and/or the valve controller 102 may include other signal processing components such as, for example, analog-to-digital converters, filters (e.g., low-pass filters, high-pass filters, and digital filters), amplifiers, etc. For example, the control signal may be filtered (e.g., using a low/high pass filter) prior to being processed by the I/P drive current slew limiter 110.

The example control unit 108, the example I/P drive current slew limiter 110, the example I/P converter 112, and/or the example pneumatic relay 114 may be communicatively coupled as shown or in any other suitable manner. The example valve controller 102 is illustrated as an electro-pneumatic controller. However, in other examples, the valve controller 102 may be a pressure transmitter or any other suitable controller device or apparatus to control the valve 104.

The control unit 108 receives the feedback signal generated by the valve 104 via the valve travel feedback communication path 103 and a control signal originating from a controller in a process control system. The control signal may be used by the control unit 108 as a set-point or reference signal corresponding to a desired operation (e.g., a position corresponding to a percentage of a control valve 104 open/closed) of the valve 104. The control unit 108 compares this feedback signal to the control signal or reference signal by utilizing the control signal and the feedback signal as values in a position control algorithm or process to determine a drive value (e.g., an I/P drive value) to be provided to the I/P converter 112. The position control process performed by the control unit 108 determines (e.g., calculates) the drive value based on the difference between the feedback signal and the control signal. This calculated difference corresponds to an amount the valve controller 102 is to change the position of the actuator 105 coupled to the valve 104. The calculated drive value also corresponds to a current generated by the control unit 108 to cause the I/P converter 112 to generate a pneumatic pressure to be provided to the pneumatic relay 114. The current may be generated by, for example, one or more transistors within the control unit 108. The calculated drive value (e.g., a voltage) may be applied to the transistor controlling the current flow through the transistor. A solenoid 113 within the I/P converter 112 is coupled to this transistor via a communication path 109 so that the same current flows through the solenoid 113 and the transistor. In this manner, the drive value controls the current through the solenoid 113.

Drive values that increase the current generated by the control unit 108 may cause the pneumatic relay 114 to increase a pneumatic pressure applied to the pneumatic actuator 105 to cause the actuator 105 to position the valve 104 towards the closed position. Similarly, drive values that decrease the current generated by the control unit 108 may cause the pneumatic relay 114 to decrease the pneumatic pressure applied to the pneumatic actuator 105 to cause the actuator 105 to position the valve 104 towards the open position. Upon calculating a drive value, the example I/P drive current slew limiter 110 determines if the calculated drive signal exceeds a slew limit by subtracting the calculated drive value from a previous drive value.

The difference between the calculated and previous drive values is a drive value change. Large changes in the calculated drive value over relatively small time periods create control position errors due to the longer time needed for current to increase within the solenoid 113 of the I/P converter 112 (i.e., due to the slew limit noted above). The high inductance of the solenoid 113 and the characteristics (e.g., output impedance, voltage, etc.) of a power supply providing a voltage to the solenoid slew limits current increases in the solenoid 113 such that the position control process performed by the control unit 108 may calculate drive values and rates of current increase in the solenoid 113 that exceed this slew limit. However, decreases in current are not similarly limited by the high inductance of the solenoid 113 and/or the characteristics of the power supply. As a result, in practice, the I/P converter 112 can decrease the actual current as quickly as the control unit 108 can decrease the calculated current.

The solenoid 113 within the I/P converter 112 uses a drive current generated by the control unit 108 to generate a magnetic field. This magnetic field is used to control a flapper that controls a flow restriction provided by a nozzle. As the drive current within the solenoid 113 increases, the magnetic field produced by the solenoid 113 increases, causing the flapper to be drawn toward to the nozzle. The flapper being drawn toward the nozzle in the solenoid 113 causes an increase in the pneumatic pressure generated by the I/P converter 112 and provided to the pneumatic relay 114. For example, the I/P converter 112 may be configured such that a 0.75 mA drive current is converted into a 42 pounds per square inch (PSI) pressure and a 1.25 mA drive current is converted into a 57 PSI pressure.

Additionally, because the I/P converter 112 converts current to a pneumatic pressure via the solenoid 113, the response to current is more accurately reflected as an average current through the solenoid 113. For example, relatively rapid actual current changes between 0.9 mA and 1.10 mA over a period of time may correspond to an average current of 1.0 mA through the solenoid 113. Thus, if the drive value applies a gate voltage on the transistor to generate current varying between 0.9 mA and 1.1 mA, the solenoid 113 within the I/P converter 112 may have an average current of 1.0 mA.

In cases where there is noise on the feedback signal and/or the control signal, the control unit 108 may amplify some of the noise in the position control process drive calculations. This amplification of the noise can cause some of the drive value calculations to exceed drive value limits. If the noise exceeds the drive value limits in an asymmetrical manner (e.g., noise with an average DC offset shift), the average drive value of the output current signal can differ from an average calculated drive value. This difference between the actual average drive value and the calculated average drive value can also result in a position control error of the valve 104.

The example I/P drive current slew limiter 110 can correct for asymmetric noise and/or asymmetric current rate increases in the solenoid 113 of the I/P converter 112 by comparing a calculated drive value change to a slew limit of the valve controller 102. The slew limit may be a predetermined drive value change limit implemented within the I/P drive current slew limiter 110. The slew limit may be configured or set based on the maximum actual current rate increase achievable in the I/P converter 112. Alternatively, the slew limit may be a function of the calculated average drive current in the solenoid 113. For example, the slew limit may be based on at least one of a quadratic relation, a linear relation, an exponential relation, a logarithmic relation, or a step relation with the calculated average drive value. Furthermore, in other implementations, the slew limit may be based on the previous drive value, the difference between the drive value and the previous drive value, the control signal, the feedback signal, an average calculated current, or an average actual current.

The example control unit 108 of FIG. 1 may monitor for noise within the feedback signal and/or the control signal. If the control unit 108 detects noise above a predetermined threshold, the control unit 108 may implement a noise slew limit and/or adjust the slew limit based on the detected noise. In other examples, the slew limit may include corrections for noise based on average noise measurements when the valve controller 102 is in different operating states.

If the calculated drive value change is greater than the slew limit, the I/P drive current slew limiter 110 changes the calculated drive value to a value based on the slew limit. For example, in cases where the calculated current is increasing and the drive value change corresponds to a current change in the solenoid 113 that is greater than the slew limit, the I/P drive current slew limiter 110 reduces the drive value such that the difference between the changed drive value and the previous drive value results in a rate of current increase in the solenoid 113 that is less than and/or equal to the slew limit. Similarly, in cases where the calculated current is decreasing, the absolute value of the drive value change may be greater than a slew limit. If the absolute value of the drive value change is greater than a slew limit, the I/P drive current slew limiter 110 may increase the magnitude of the drive value so that the drive value change corresponds to a current change that is less than and/or equal to the slew limit.

Upon comparing and/or changing the drive value based on the slew limit, the control unit 108 converts the drive value to a drive signal (e.g., a current via a transistor) and applies the drive signal to the solenoid 113 within the I/P converter 112 via the communication path 109. The magnitude of the current corresponds to the drive value. The I/P converter 112 may be a current-to-pressure type transducer in which case the drive signal is a current that is varied by, for example, a transistor within the control unit 108 to achieve the desired condition (e.g., position) of the valve 104. Alternatively, the I/P converter 112 may be a voltage-to-pressure type of transducer, in which case the drive signal is a voltage that varies to provide a varying pressure output to control the valve 104. The I/P converter 112 is fluidly coupled to a supply pressure source 120 (e.g., a pressurized air source) and converts the drive signal from the control unit 108 to a pressure signal using the pressurized fluid (e.g., pressurized air, hydraulic fluid, etc.) from the pressure supply source. The I/P converter 112 is configured to send the pressure signal to the pneumatic relay 114.

Figure 2:
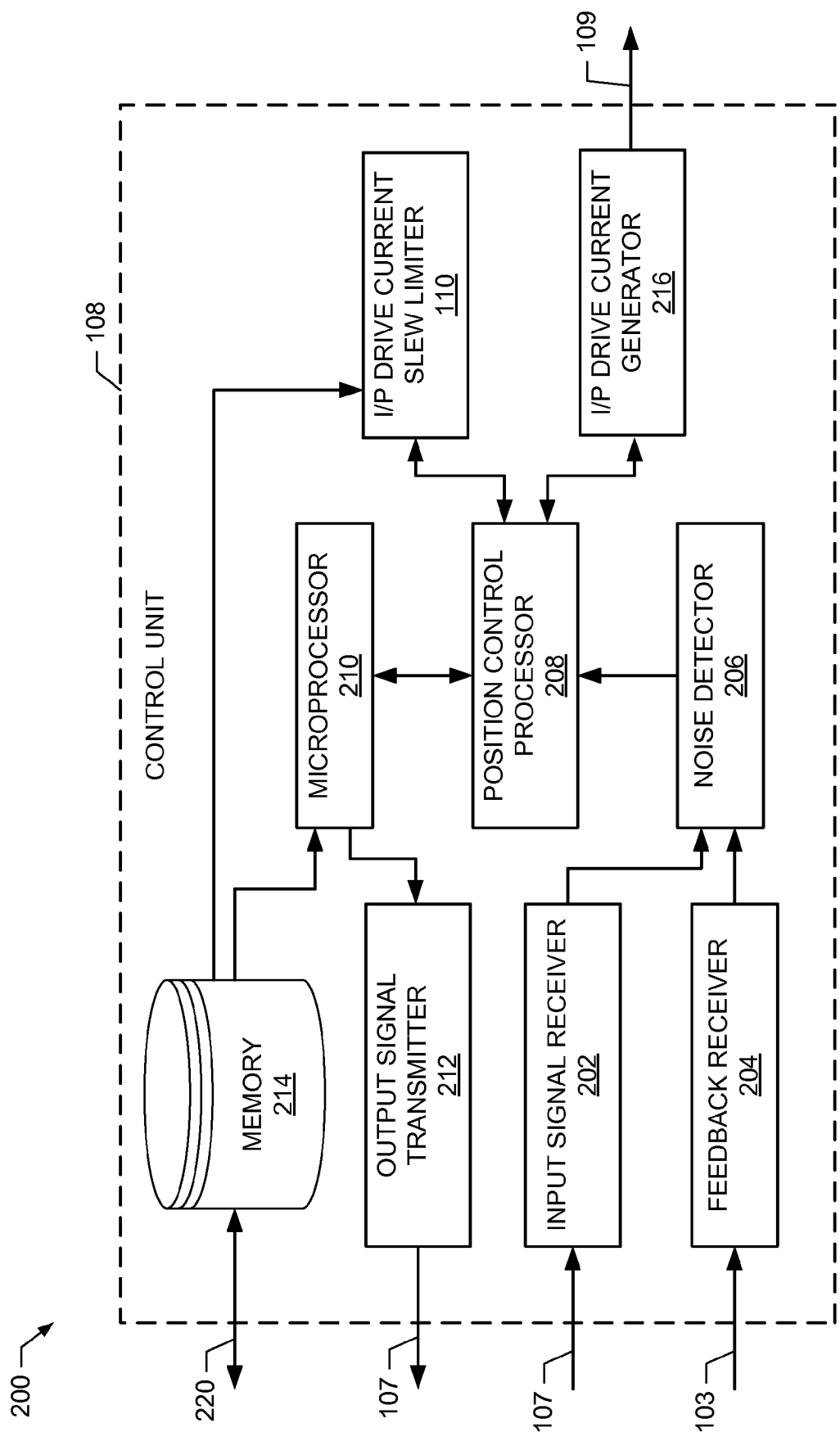
FIG. 2 is a block diagram of the control unit and the example I/P drive current slew limiter of FIG. 1.

FIG. 2 is a block diagram 200 of the control unit 108 and the example I/P drive current slew limiter 110 of FIG. 1. To receive control signals from a process control system via the communication path 107, the example control unit 108 includes an input signal receiver 202. The input signal receiver 202 receives electrical control signals and converts the electrical control signals into digital information for processing. The electrical signals may include analog, discrete, and/or digital information forwarded from a process control system.

Additionally, the input signal receiver 202 may be implemented with a Highway Addressable Remote Transducer (HART) protocol to enable a process control system to communicate with the control unit 108. Furthermore, the example input signal receiver 202 may filter the control signals for any electromagnetic noise coupled from the operating environment. Upon receiving and/or processing a control signal, the input signal receiver 202 sends the control signal and/or data within the control signal to a noise detector 206.

To receive valve travel feedback signals via the valve travel feedback communication path 103, the example control unit 108 includes a feedback receiver 204. The feedback receiver 204 may include a position sensor interface for processing the position signals from the valve 104 of FIG. 1. Additionally, the example feedback receiver 204 may include a pressure sensor interface for pressure signals from the valve 104. The feedback receiver 204 may be implemented with a HART protocol to enable the valve 104 to communicate with control unit 108. Furthermore, the example feedback receiver 204 may filter the feedback signals (e.g., the pressure and/or the position signal) for any electromagnetic noise coupled from the operating environment. Upon receiving and/or processing a feedback signal, the feedback receiver 204 sends the feedback signal and/or data within the feedback signal to the noise detector 206.

To detect noise within the control signal and/or the feedback signal, the example control unit 108 of FIG. 2 includes the noise detector 206. Additionally, the noise detector 206 may detect noise within the control unit 108 from external environment sources and/or from internal components within the control unit 108 (e.g., a microprocessor 210). In other examples when a slew limit is not based on noise, the example control unit 108 may not include the noise detector 206.

The example noise detector 206 determines if there is noise within the control signal and/or the feedback signal by determining if an amplitude or an average value of the noise is greater than a noise threshold. The noise threshold may be specified by a controller of a process control system and/or may be calculated based on noise levels during different operating conditions of the valve controller 102. Upon determining if there is noise on the control signal and/or the feedback signal, the noise detector 206 forwards the control signal and/or the feedback signal to a position control processor 208. Additionally, if the noise detector 206 determines there is noise within the control signal and/or the feedback signal, the noise detector 206 transmits a message to the position control processor 208. The message may include an indication that the noise within the control signal and/or the feedback signal exceeds the noise threshold. Additionally, the message may include an approximation of the magnitude by which the noise exceeds the noise thresholds, which signal contains the noise, frequency components of the noise, and/or any other relevant noise information.

To perform a position control algorithm or process to calculate I/P drive values, the example control unit 108 includes the position control processor 208 (e.g., a servo control processor). The position control processor 208 receives the feedback signal and the control signal via the noise detector 206. The position control processor 208 may include a position control servo and a pressure control servo for calculating an I/P drive value from a feedback signal including the position signal, the pressure signal, and a control signal.

The example position control processor 208 may implement the position control servo or the pressure control servo using a proportional-integral-derivative feedback (PID) control based on the feedback signal and the control signal. For example the PID control may subtract the control signal and the feedback signal to generate an error signal (e.g., a difference between the feedback signal and the control signal). This error signal is processed in a proportional controller including an amplifier having a gain set or tuned as appropriate to generate a signal proportional to the error signal. The gain of each respective servo control module may differ based on the differing nature of the feedback signal and other aspects of the feedback control scheme.

Furthermore, the position control processor 208 may include an amplifier having a gain that prepares the error signal for an accumulator that integrates the error over time. The accumulator, in turn, includes a summer and a delay element that stores the previous integration value and returns it to the summer. The signals generated by the proportional and integral controllers are provided along with a signal generated by a derivative controller to a summer to produce a drive value for the I/P drive current slew limiter 110. Each derivative controller includes a derivative operator that generates an indication of the derivative with respect to time of the feedback signal, and an amplifier having a respective gain. Additionally, the position control processor 208 may store each calculated I/P drive value to a memory 214 via the microprocessor 210. Furthermore, upon calculating an I/P drive value, the position control processor 208 transmits the I/P drive value to the I/P drive current slew limiter 110.

To limit a change of an I/P drive value, the example control unit 108 includes the I/P drive current slew limiter 110. The I/P drive current slew limiter 110 receives the I/P drive value from the position control processor 208. The I/P drive current slew limiter 110 then calculates a difference between the I/P drive value and a previous I/P drive value. This difference is an I/P drive value change. The I/P drive current slew limiter 110 may acquire the previous I/P drive value by accessing the memory 214. The previous I/P drive value is the most recent I/P drive value transmitted to the I/P converter 112.

The I/P drive current slew limiter 110 then determines if an absolute value of the I/P drive value change is greater than a slew limit associated with the I/P converter 112. If the absolute value of the I/P drive value change is greater than the slew limit, the I/P drive current slew limiter 110 reduces or increases the I/P drive value such that the I/P drive value change corresponds to a current change in the solenoid 113 that is equal or less than the slew limit. Upon changing the I/P drive value or determining that the I/P drive value does not need to be changed, the I/P drive current slew limiter 110 transmits the I/P drive value to the position control processor 208 for forwarding to an I/P drive current generator 216.

In cases when the slew limit is based on a calculated average current, the I/P drive current slew limiter 110 calculates the slew limit prior to comparing the I/P drive value change to the slew limit. For example, the slew limit may be based on at least one of a quadratic relation, a linear relation, an exponential relation, a logarithmic relation, or a step relation with the calculated average I/P drive value. Furthermore, in other implementations, the slew limit may be based on the previous drive value, the difference between the drive value and the previous drive value, the control signal, the feedback signal, an average calculated current, or an average actual current. In other cases, the slew limit may be based on a measured set of maximum current change values of the solenoid 113 in the I/P converter 112. The slew limit and/or a function relating a slew limit to the average drive current may be stored within the I/P drive current slew limiter 110 or, alternatively, within the memory 214.

Furthermore, if the I/P drive current slew limiter 110 receives a message originating from the noise detector 206 indicating the feedback signal and/or the control signal includes noise, the I/P drive current slew limiter 110 may calculate a noise slew limit and/or apply a noise slew limit to the calculated I/P drive value. The noise slew limit may be predetermined by characterizing noise within the feedback signal and/or the control signal during different operating conditions of the valve controller 104. The noise slew limit may be a single value or, alternatively, may be based on the amount of noise within the feedback signal and/or the control signal. Additionally, the noise slew limit may be stored within the I/P drive current slew limiter 110 or the memory 214.

To generate a drive current from the I/P drive value (e.g., a voltage), the example control unit 108 of FIG. 2 includes the I/P drive current generator 216. The example I/P drive current generator 216 receives a slew limited I/P drive value from the position control processor 208. Upon receiving an I/P drive value, the I/P drive current generator 216 generates a current with a magnitude corresponding to the I/P drive value. The I/P drive current generator 216 may generate the current using a transistor, a current source, a digital-to-analog (DAC) converter, and/or any other component capable of generating a controlled current signal. Upon generating the drive current, the I/P drive current generator 216 causes the drive current to flow through the solenoid 113 within the I/P converter 112 via the communication path 109. For example, the I/P drive current generator 216 may include a transistor that is controlled with the drive value. As the drive value is applied to the transistor, a drive current based on the applied drive value voltage flows through the transistor and the solenoid 113. Alternatively, in examples where the I/P converter 112 requires a voltage signal, the I/P drive current generator 216 may include components for generating a voltage including information from the I/P drive value.

To manage diagnostics, communications, and other general control functionality, the example control unit 108 includes the microprocessor 210. The example microprocessor 210 may be implemented by any type of processor, microcontroller, control logic, digital signal processor, application specific integrated circuit, and/or any other type of component capable of managing the control unit 108.

The example microprocessor 210 receives slew limited I/P drive values from the position control processor 208 and stores these I/P drive values to the memory 214. Additionally, the microprocessor 210 processes any communication messages sent from a process control system to the control unit 108 via the communication path 107. These communication messages may request an operating status of the control unit 108, diagnostic information of the control unit 108, calculated I/P drive values, actual I/P drive values, average drive current information, noise information, and/or any other functional information. Upon receiving a communication message, the microprocessor 210 generates the appropriate response and sends the response to an output signal transmitter 212.

The example microprocessor 210 may monitor the functions within the control unit 108 and provide any status updates of these functions to a process control system. For example, the microprocessor 210 may monitor the position control process within the position control processor 208 to verify the process is operating correctly. In another example, the microprocessor 210 may monitor of large amounts of noise within the feedback signal and/or the control signal. In yet another example, the microprocessor 210 may determine control signals and/or feedback signals are not being received in the control unit 108. Furthermore, the microprocessor 210 may monitor the I/P drive current slew limiter 110 for any deviations from applying a slew limit to a calculated I/P drive value. Still further, the microprocessor 210 may monitor the I/P drive current generator 216 to determine if excess current is being drawn by the I/P converter 112 due to a possible short circuit condition.

To transmit messages originating from the microprocessor 210, the example control unit 108 includes the output signal transmitter 212. The example output signal transmitter 212 converts messages from the microprocessor 210 into an analog and/or digital format for transmission to a process control system via the communication path 107. The output signal transmitter 212 may format data compatible with Ethernet, universal serial bus (USB), IEEE 1394, etc. Alternatively, the output signal transmitter 212 may wirelessly communicate to the process control system by using a wireless communication medium (e.g., wireless Ethernet, IEEE-802.11, Wi-Fi®, Bluetooth®, etc.).

To store calculated I/P drive values, slew limited I/P drive values, slew limits, noise slew limits, and slew limit functions, the control unit 108 of FIG. 2 includes the memory 214. The example memory may be implemented by EEPROM, RAM, ROM, and/or any other type of memory. The memory 214 is communicatively coupled to a process control system via the communication path 220. An operator of the process control system may store slew limits and/or slew limit functions to the memory via the communication path 220. Additionally, the operator may modify and/or change slew limits and/or slew limit functions stored within the memory 214.

While an example manner of implementing the control unit 108 is depicted in FIG. 2, one or more of the interfaces, data structures, elements, processes and/or devices illustrated in FIG. 2 may be combined, divided, rearranged, omitted, eliminated and/or implemented in any other way. For example, the example input signal receiver 202, the example feedback receiver 204, the example noise detector 206, the example position control processor 208, the example microprocessor 210, the example output signal transmitter 212, the example I/P drive current slew limiter 110, and/or the example I/P drive current generator 216 illustrated in FIG. 2 may be implemented separately and/or in any combination using, for example, machine-accessible or readable instructions executed by one or more computing devices and/or computing platforms (e.g., the example processing platform 810 of FIG. 8).

Further, the example input signal receiver 202, the example feedback receiver 204, the example noise detector 206, the example position control processor 208, the example microprocessor 210, the example output signal transmitter 212, the example I/P drive current slew limiter 110, the example I/P drive current generator 216, and/or more generally, the control unit 108 may be implemented by hardware, software, firmware and/or any combination of hardware, software and/or firmware. Thus, for example, any of the example input signal receiver 202, the example feedback receiver 204, the example noise detector 206, the example position control processor 208, the example microprocessor 210, the example output signal transmitter 212, the example I/P drive current slew limiter 110, the example I/P drive current generator 216, and/or more generally, the control unit 108 can be implemented by one or more circuit(s), programmable processor(s), application specific integrated circuit(s) (ASIC(s)), programmable logic device(s) (PLD(s)) and/or field programmable logic device(s) (FPLD(s)), etc.

Figure 3A:
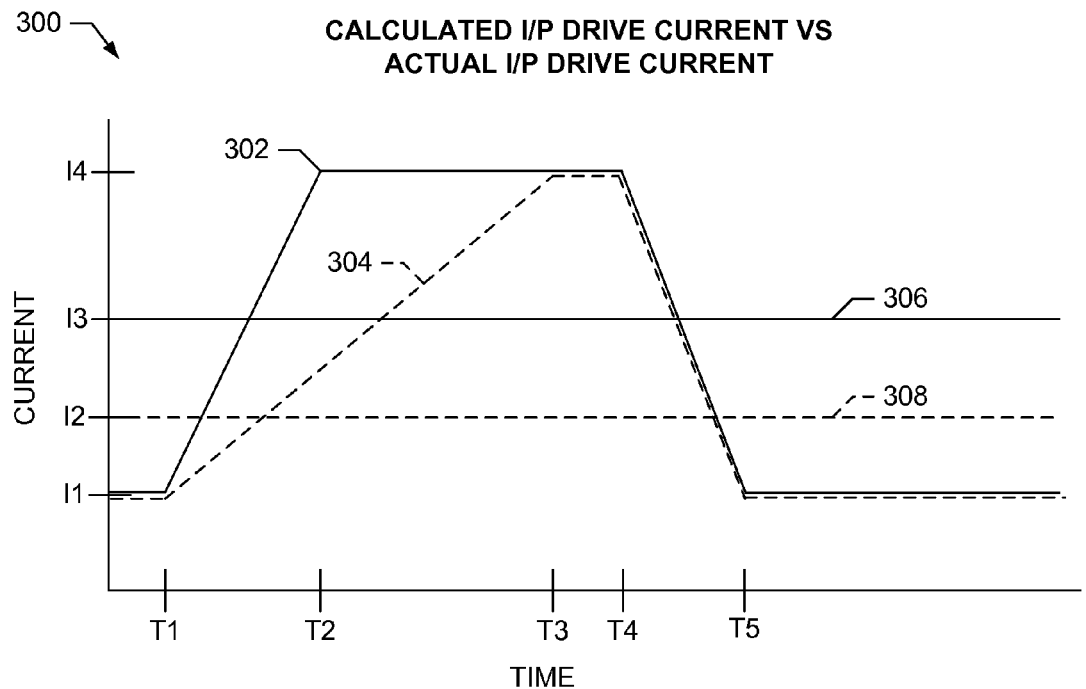
FIG. 3A is a drive current graph of a calculated I/P drive current and an actual I/P drive current for the valve controller of FIG. 1 without the example I/P drive current slew limiter of FIGS. 1 and 2.

FIG. 3A is a drive current graph 300 of a calculated I/P drive current 302 and an actual I/P drive current 304 for the valve controller 102 of FIG. 1 without the example I/P drive current slew limiter 110 of FIGS. 1 and 2. The drive current graph 300 includes an x-axis time scale and a y-axis current scale. The time axis may be scaled to minutes, seconds, milliseconds, microseconds, nanoseconds, etc. The current axis may be scaled to amps, milliamps, microamps, nanoamps, etc. Furthermore, in other examples where the control unit 108 generates a drive voltage, the y-axis may include a voltage. In the example of the valve controller 102 of FIG. 1, the drive current graph 300 of FIG. 3 includes a time T1 at 100 milliseconds, a time T5 at 1500 milliseconds, a current I1 at 0.8 milliamps, and a current I4 at 1.20 milliamps.

The example drive current graph 300 shows the calculated I/P drive current 302 and the actual I/P drive current 304 over a period of time. The calculated I/P drive current 302 corresponds to a calculated I/P drive value in the control unit 108. The actual I/P drive current 304 is the current applied to the I/P converter 112. For clarity, the calculated I/P drive current 302 and the actual I/P drive current 304 are shown in some instances as adjacent to each other to distinguish each of the I/P drive currents 302 and 304. In these instances, the I/P drive currents 302 and 304 should be superimposed on each other.

The drive current graph 300 shows that the calculated I/P drive current 302 starting at the current of I1. At the time T1 the control unit increases the calculated I/P drive current 302 until the calculated I/P drive current 302 reaches the current I4. From a time T2 until a time T3, the control unit 108 maintains the calculated I/P drive current 302 at I4. Then at a time T4, the control unit 108 decreases the calculated I/P drive current 302 until it reaches I1 at the time T5. However, while the control unit 108 is calculating the I/P drive current, the I/P converter 112 has an actual current shown as the actual I/P drive current 304. At the time T1, the I/P converter 112 is not able to increase its current at the same rate as the calculated I/P drive current 302. Because in this example the control unit 108 does not include the I/P drive current slew limiter 110, the calculated I/P drive current 302 is not limited to the maximum current increase limits (i.e., the slew limit) within the I/P converter 112. As a result, the actual I/P drive current 304 increases at a slower rate and does not reach the current I4 until a time T3 after the time T2. The difference between the I/P drive currents 302 and 304 from the times T1 to T3 can lead to control positioning error of the actuator coupled to the valve 104 of FIG. 1. Also, because the inductance of the solenoid 113 within the I/P converter 112 does not similarly limit the rate at which the actual I/P drive current 304 can be decreased, the actual I/P drive current 304 matches the calculated I/P drive current 302 from the times T4 to T5.

Additionally, the example drive current graph 300 shows average drive currents 306 and 308 for the respective I/P drive currents 302 and 304. The calculated average drive current 306 corresponds to the calculated I/P drive current 302 and the actual average drive current 308 corresponds to the actual I/P drive current 304. The average drive currents 306 and 308 are shown as straight lines because they are averaged over a longer time period than shown in the drive current graph 300. The actual average drive current 308 has a current I2 while the calculated average drive current 306 has a current I3. The actual average drive current 308 is lower than the calculated average drive current 306 because the actual I/P drive current 304 is rate limited and requires a longer time (e.g., T3-T2) to reach the current I4.

Figure 3B:
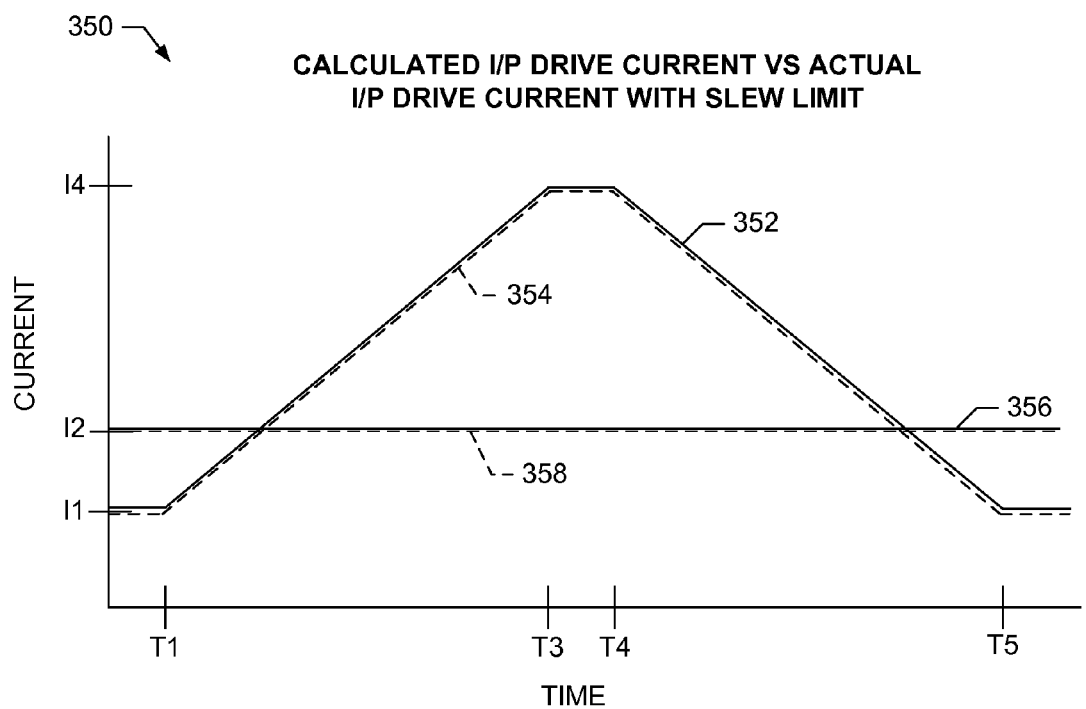
FIG. 3B is a drive current graph of a calculated I/P drive current and an actual I/P drive current for the valve controller of FIG. 1 including the example I/P dive current slew limiter of FIGS. 1 and 2.

FIG. 3B is a drive current graph 350 of a calculated I/P drive current 352 and an actual I/P drive current 354 for the digital valve controller 102 including the example I/P drive current slew limiter 110 of FIGS. 1 and 2. The drive current graph 350 is similar to the drive current graph 300 of FIG. 3A with the exception that the calculated I/P drive current 352 is limited based on a slew limit. In the drive current graph 350 of FIG. 3B, the I/P drive current slew limiter 110 includes a slew limit that corresponds to the maximum achievable current rate increase within the I/P converter 112, as shown with the actual I/P drive current 304 from the times T2 to T3 in FIG. 3A.

As a result of the slew limit applied by the I/P drive current slew limiter 110, the calculated I/P drive current 352 is rate limited based on the maximum achievable current increase in the I/P converter 112. Thus, the actual I/P drive current 354 matches the calculated I/P drive current 352 over all the time periods from T1 through T5. The slew limit is also applied to the decrease in I/P drive current from the times T4 through T5 to provide symmetric control of the I/P drive current. The match between the actual I/P drive current 354 and the calculated I/P drive current 352 and the symmetric control provides accurate positioning control for the actuator coupled to the valve 104 of FIG. 1.

Furthermore, the drive current graph 350 of FIG. 3B includes a calculated average drive current 356 corresponding to the calculated I/P drive current 352 and an actual average drive current 358 corresponding to the actual I/P drive current 354. Because the actual and calculated I/P drive currents 352 and 354 are matched or substantially equal, the calculated and the actual average drive currents 356 and 358 match or are substantially equal.

Figure 4A:
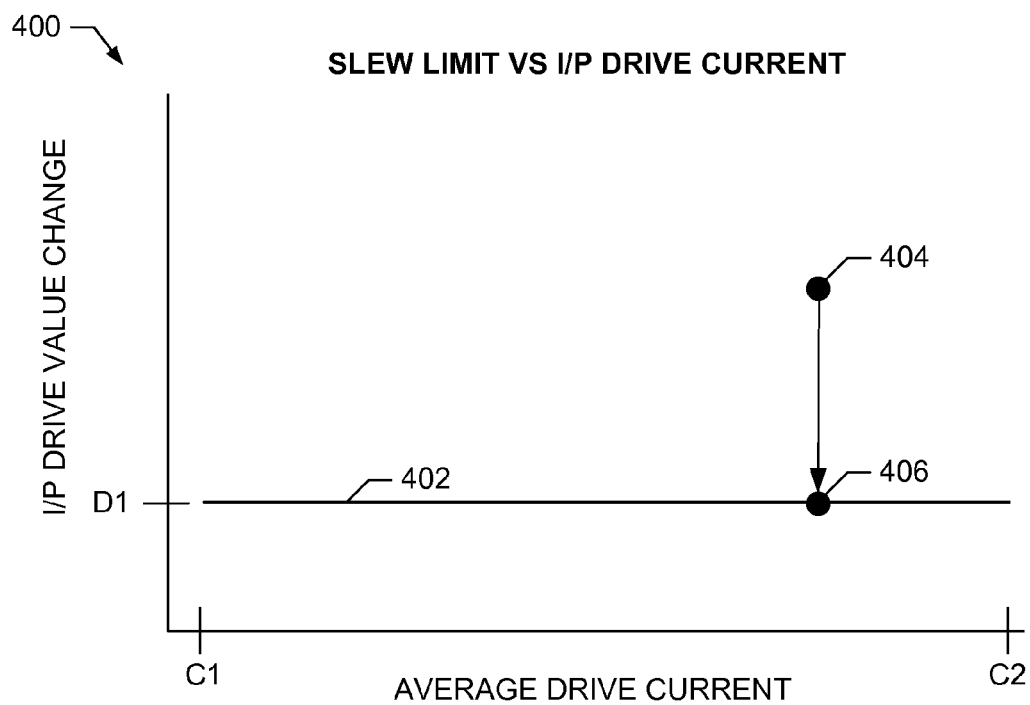
FIGS. 4A and 4B are slew limit graphs of slew limits based on average I/P drive currents.
Figure 4B:
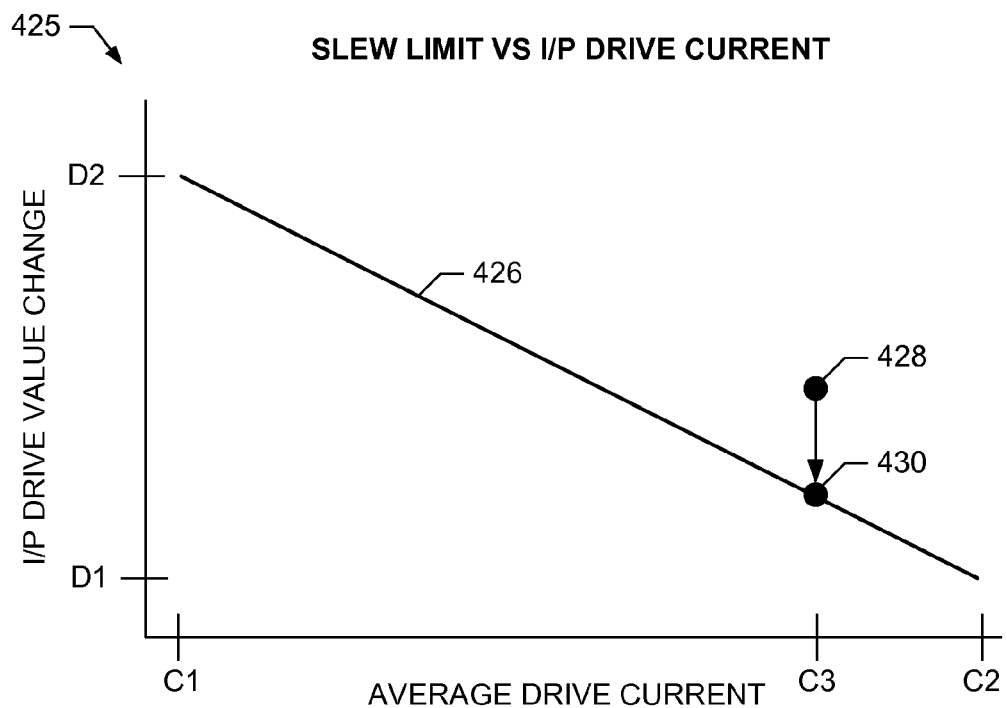

FIGS. 4A and 4B are slew limit graphs 400 and 425 of slew limits based on average I/P drive currents. The x-axis of the slew limit graphs 400 and 425 show an average drive current. This drive current may be scaled to amps, milliamps, microamps, nanoamps, etc. Additionally, y-axis of the slew limit graphs 400 and 425 show an amount of an I/P drive value change. The I/P drive value change may be scaled to amps/second, milliamps/second, milliamps/millisecond, etc. The I/P drive value change is equal to a difference between a current I/P drive value and a previous I/P drive value (e.g., the rate at which the current I/P drive value changes from the previous I/P drive value). Additionally, the slew limit graphs 400 and 425 show slew limits 402 and 426 for bidirectional I/P drive value changes.

The slew limit graph 400 of FIG. 4A shows the slew limit 402 at an I/P drive value change of D1 for any average drive current from C1 to C2. The slew limit 402 may be a calculated maximum I/P drive current change of the I/P converter 112. Additionally, this slew limit 402 may be determined by the example method 500 of FIG. 5. In the example of FIG. 4A, a calculated I/P drive value change 404 is greater than the slew limit 402. The I/P drive current slew limiter 110 changes the calculated I/P drive value change 404 by reducing the calculated I/P drive value change 404 to the I/P drive change value 406 at the slew limit. In other examples, the I/P drive value 404 may be reduced to below the slew limit 402.

The slew limit graph 425 of FIG. 4B shows a slew limit 426 that is based on the average drive current. In this example, the slew limit decreases linearly from D2 to D1 as the average drive current increases from C1 to C2. This linear decrease may be a result of a maximum current change in the I/P converter 112. For example, as the average current in the I/P converter 112 approaches the power provided to the I/P converter 112, the maximum current decreases. In other examples, the slew limit 426 may have a quadratic relation, a linear relation, an exponential relation, a logarithmic relation, and/or a step relation with the average drive current. Additionally, the slew limit may be based on the calculated drive value, a previous drive value, a difference between the drive value and the previous drive value, a control signal, a feedback signal, an average calculated drive value, and/or an average actual drive value. In yet other examples, the slew limit 426 may be based on the noise within the feedback signal and/or the control signal.

In the example slew limit graph 425, a calculated I/P drive value change 428 is greater than the slew limit 426. The I/P drive current slew limiter 110 reduces the calculated I/P drive value change 428 to an adjusted I/P drive value change 430 at the slew limit 426. In this example, the calculated I/P drive value change 428 is at an average current C3. This average current C3 may be the average current with the calculated I/P drive value change 428 or with the I/P drive value change 430. Alternatively, the average drive current C3 may correspond to the actual average drive current prior to incorporating a calculated I/P drive value corresponding to the calculated I/P drive value change 428.

Figure 5:
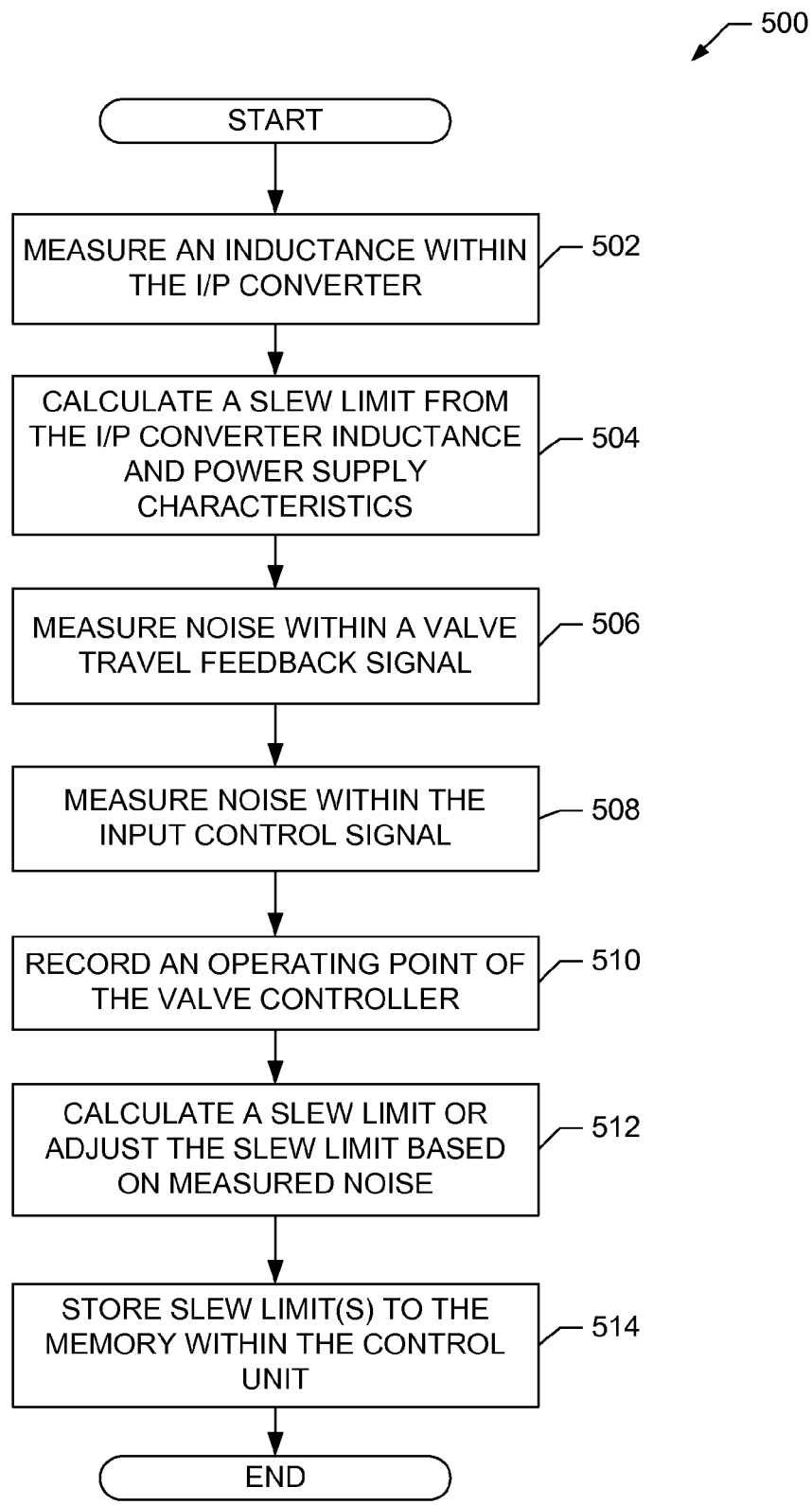
FIGS. 5, 6, and 7 are flowcharts of example methods that may be used to implement the example I/P drive current slew limiter, the example servo control processor, the example circuit board, and/or the digital valve controller of FIGS. 1 and 2.
Figure 6:
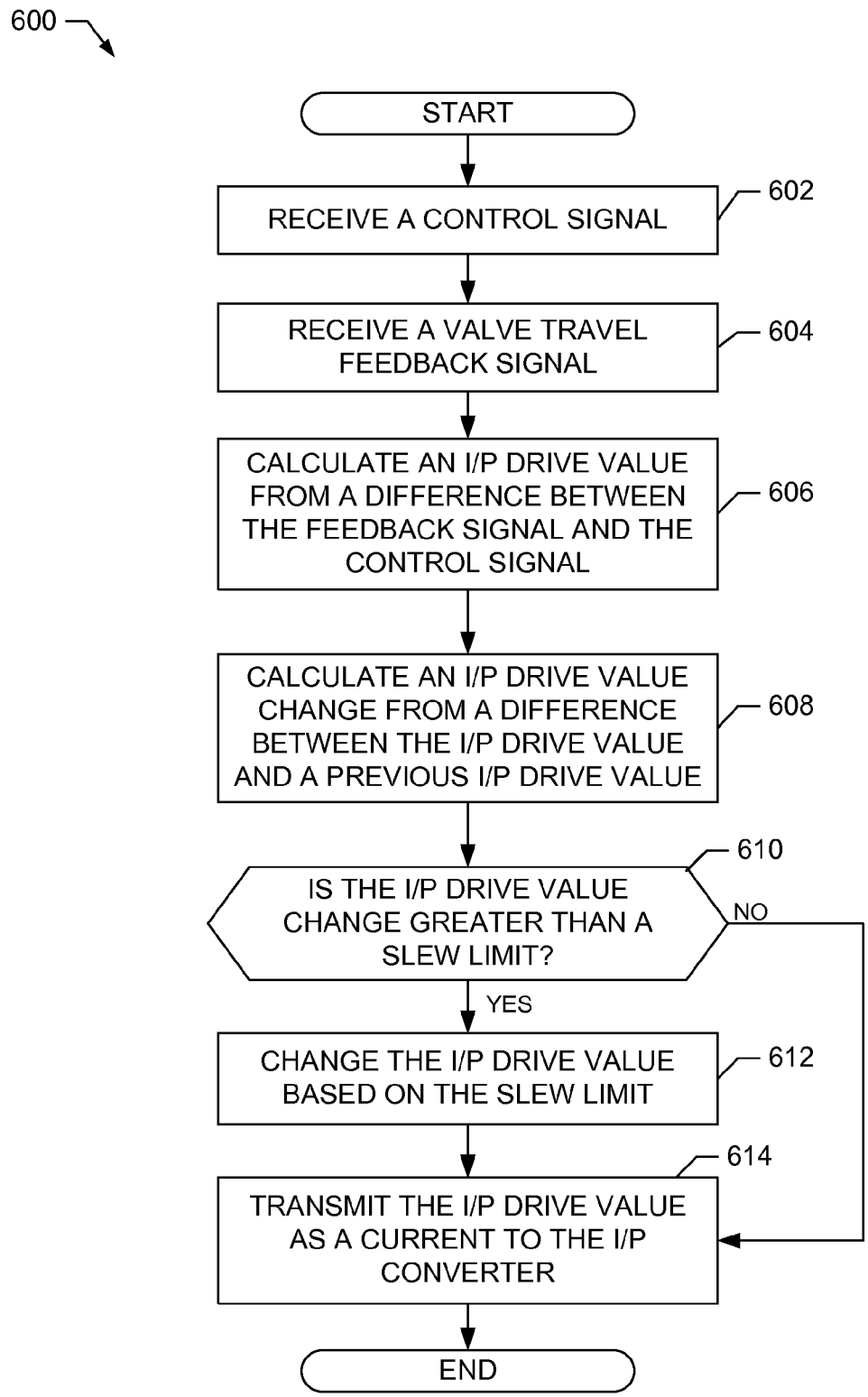
Figure 7:
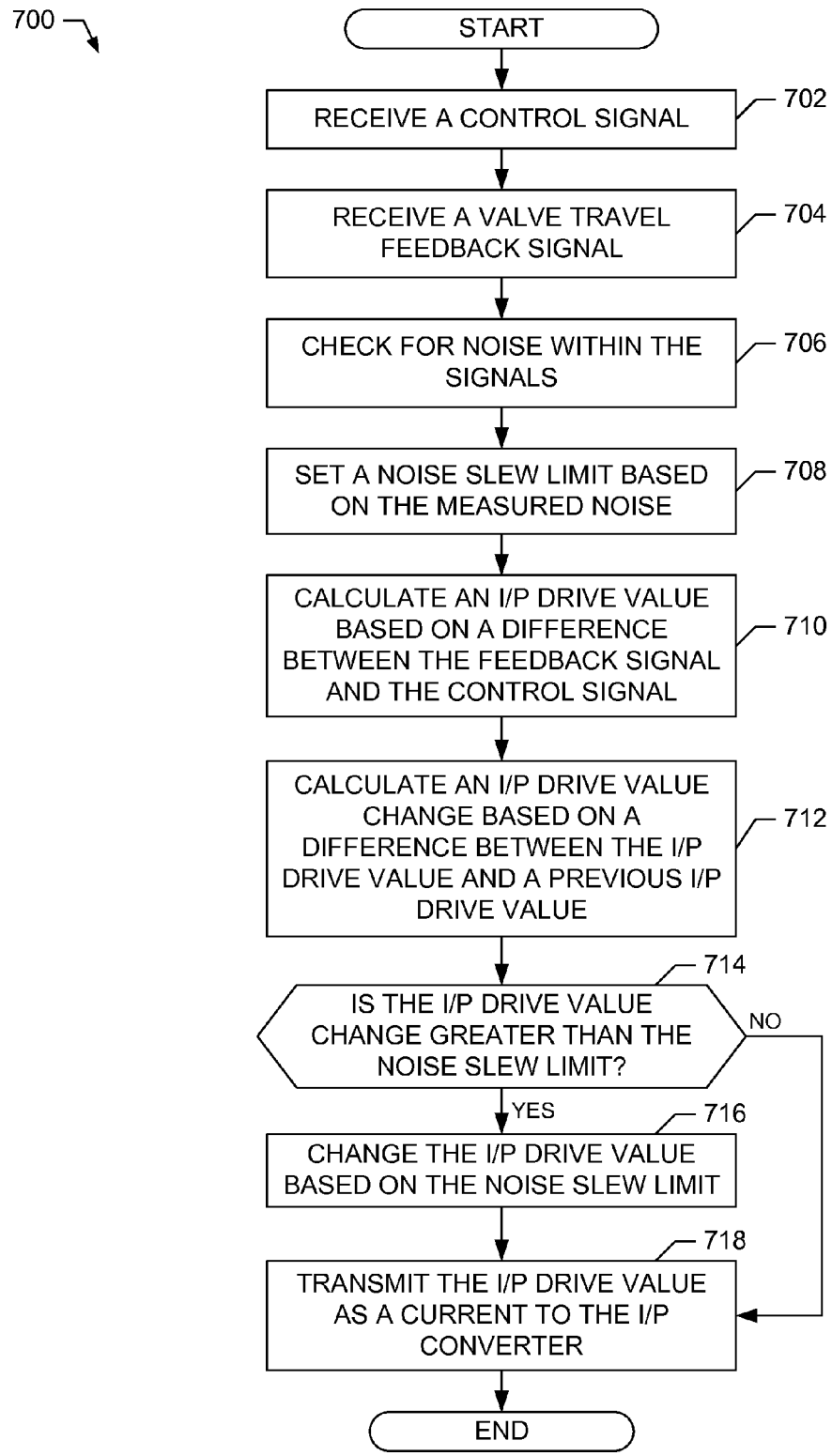

FIGS. 5, 6, and 7 are flowcharts of example methods that may be carried out to implement the example digital valve controller 104, the example circuit board 108, the example I/P drive current slew limiter 110, the example noise detector 206, the example servo control processor 208, and/or the example microprocessor 210 of FIGS. 1 and/or 2. The example methods of FIGS. 5, 6, and 7 may be carried out by a processor, a controller and/or any other suitable processing device. For example, the example methods of FIGS. 5, 6, and 7 may be embodied in coded instructions stored on any tangible computer-readable medium such as a flash memory, a CD, a DVD, a floppy disk, a ROM, a RAM, a programmable ROM (PROM), an electronically-programmable ROM (EPROM), an electronically-erasable PROM (EEPROM), an optical storage disk, an optical storage device, magnetic storage disk, a magnetic storage device, and/or any other medium that can be used to carry or store program code and/or instructions in the form of methods or data structures, and which can be accessed by a processor, a general-purpose or special-purpose computer, or other machine with a processor (e.g., the example processor platform 810 discussed below in connection with FIG. 8). Combinations of the above are also included within the scope of computer-readable media. Methods comprise, for example, instructions and/or data that cause a processor, a general-purpose computer, special-purpose computer, or a special-purpose processing machine to implement one or more particular methods. Alternatively, some or all of the example methods of FIGS. 5, 6, and 7 may be implemented using any combination(s) of ASIC(s), PLD(s), FPLD(s), discrete logic, hardware, firmware, etc. Also, some or all of the example methods of FIGS. 5, 6, and 7 may instead be implemented using manual operations or as any combination of any of the foregoing techniques, for example, any combination of firmware, software, discrete logic and/or hardware. Further, many other methods of implementing the example operations of FIGS. 5, 6, and 7 may be employed. For example, the order of execution of the blocks may be changed, and/or one or more of the blocks described may be changed, eliminated, sub-divided, or combined. Additionally, any or all of the example methods of FIGS. 5, 6, and 7 may be carried out sequentially and/or carried out in parallel by, for example, separate processing threads, processors, devices, discrete logic, circuits, etc.

The example method 500 of FIG. 5 determines a slew limit for the I/P drive current slew limiter 110 of FIG. 1. The example method 500 of FIG. 5 calculates a slew limit for a single set of valve controller 102 operating conditions. Other example methods 500 may be implemented to determine slew limits for other operating conditions of the valve controller 102. Additionally, one or more slew limits calculated from the example method 500 may be combined together to form a relationship between a slew limit value and the operating conditions of the valve controller 102. Furthermore, the example method 500 may be used to determine a functional relationship between a slew limit and applied actual current to the I/P converter 112.

The example method 500 begins when the control valve assembly 100 is activated and an inductance of the solenoid 113 within the I/P converter 112 is measured (block 502). A slew limit is then calculated from the measured inductance and the characteristics of the power supply to the I/P converter 112 (block 504). In other examples, the slew limit may be calculated from the actual maximum current rate change in the I/P converter 112. In yet other examples, the slew limit may be calculated as a function of the maximum current rate change in the I/P converter 112 for different average drive currents.

Upon calculating the slew limit (block 504), the noise within the travel feedback signal is measured (block 506). Next, the noise in the control signal is measured (block 508) and the operating point of the valve controller 102 is recorded (block 510). Additionally, the noise within the valve controller 102, the control unit 108, and/or on the connector 106 may be measured. In some example implementations, the calculation of the slew limit (block 504) and the measurement of the noise within the feedback and control signals (blocks 506 and 508) may be repeated for different operating points of the valve controller 102 (block 510) or, alternatively, may be implemented at regular intervals of time, including, for example, each instance the feedback and control signals are measured.

The example method 500 of FIG. 5 continues when a new slew limit is calculated or the previous slew limit is adjusted based on the measured noise at the operating point of the valve controller 102 (block 512). A new slew limit may be calculated for cases when the valve controller 102 detects noise within the control signal and/or the feedback signal and adjusts the slew limit based on the determined noise. In other examples, the valve controller 102 may activate a slew limit control upon detecting noise within the feedback signal and/or the control signal. The example method 500 ends when the calculated slew limit(s) are stored to the memory 214 within the control unit 108 (block 514).

The example method 600 of FIG. 6 limits a change of a drive value calculated by the position control algorithm or process within the control unit 108 of FIG. 1. The example method 600 shows a single calculation of a drive value and a comparison to a slew limit. However, the example method 600 may initiate for each instance of a received control signal and/or a received valve travel feedback signal. The example method 600 begins when the control valve assembly 100 of FIG. 1 is in an operational state and the valve controller 102 receives a control signal and a feedback signal (blocks 602 and 604). Next, an I/P drive value is calculated from the difference between the feedback signal and the control signal (block 606). This I/P drive value corresponds to the amount the valve controller 102 is to open or close the actuator coupled to the valve 104.

Upon calculating the I/P drive value, an I/P drive value change is calculated from the difference between the I/P drive value and a previous I/P drive value (block 608). The previous I/P drive value is the I/P drive value transmitted to the I/P converter 112 prior to the valve controller 102 receiving the most recent control signal and feedback signal. The previous I/P drive value may also have been changed based on a slew limit. Next, the I/P drive value change is compared to the slew limit (block 610). The slew limit may be based on (e.g., a function) the I/P drive value change, the average calculated current with the I/P drive value, the I/P drive value, and or the average calculated current prior to adding the I/P drive value. Alternatively, the slew limit may be a value corresponding to the maximum I/P drive value change in the I/P converter 112.

In cases when the I/P drive value change is positive, if the I/P drive value change is less than the slew limit (block 610), the I/P drive value is not modified and the control unit 108 transmits the I/P drive value as a current to the I/P converter 112 (block 614). Additionally, in cases when the I/P drive value change is negative (e.g., a decreasing I/P drive value), if the I/P drive value change is less than the slew limit (block 610), the I/P drive value is not modified and the control unit 108 transmits the I/P drive value as a current to the I/P converter 112 (block 614). However, if the I/P drive value change is positive and the I/P drive value change is greater than the slew limit (block 610) or the I/P drive value change is negative and the I/P drive value change is greater than the slew limit (block 610), the I/P drive value is changed based on the slew limit (block 612). In cases of a positive I/P drive value change, the I/P drive value is reduced to the previous value plus the slew limit or reduced to a value less than the previous I/P drive value plus the slew limit. Similarly, in cases of a negative I/P drive value change, the I/P drive value is increased to the previous I/P drive value minus the slew limit or reduced to a value greater than the previous I/P drive value minus the slew limit. The example method ends when the changed I/P drive value is transmitted as a current to the I/P converter 112 (block 614).

The example method 700 of FIG. 7 limits a change of a drive value due to noise within the feedback signal and/or the control signal. The example method 700 shows a single calculation of a drive value and a comparison to a slew limit. However, the example method 700 may be performed for each instance of a received control signal and/or a received valve travel feedback signal. In other implementations, the example method 700 may set a slew limit based on detected noise within the valve controller 102 and/or within the connector 106 from external environmental noise. The example method 700 begins when the control valve assembly 100 of FIG. 1 is in an operational state and the valve controller 102 receives a control signal and a feedback signal (blocks 702 and 704). Next, the feedback signal and/or the control signal are checked for noise (block 706). The check for noise within the signals may include determining if an amplitude or an average value of the noise is greater than a noise threshold. In some examples, the check for noise may occur after the control signal and/or the feedback signal are filtered within the valve controller 102 and/or the control unit 108. In other examples, the noise may be checked prior to any filtering.

Next, a slew limit is set based on the measured noise (block 708). The slew limit relationship with the noise may be determined by the example method 500 of FIG. 5. In cases when noise is not greater than a noise threshold, the slew limit may be only be based on the I/P drive value change and/or an average calculated current based on the I/P drive value. Alternatively, the slew limit may correspond to the maximum current change in the I/P converter 112. In cases when the noise is greater than the noise threshold, the noise slew limit may be based on the noise and the I/P drive value change and/or the average calculated current. An I/P drive value is then calculated based on the difference between the feedback signal and the control signal (block 710). Upon calculating the I/P drive value, an I/P drive value change is calculated based on the difference between the I/P drive value and a previous I/P drive value (block 712).

The example method 700 of FIG. 7 continues when the I/P drive value change is compared to the noise slew limit (block 714). In cases when the I/P drive value change is positive, if the I/P drive value change is less than the noise slew limit (block 714), the I/P drive value is not modified and the control unit 108 transmits the I/P drive value as a current to the I/P converter 112 (block 718). Additionally, in cases when the I/P drive value change is negative (e.g., a decreasing I/P drive value), if the I/P drive value change is less than the noise slew limit (block 714), the I/P drive value is not modified and the control unit 108 transmits the I/P drive value as a current to the I/P converter 112 (block 718).

However, if the I/P drive value change is positive and the I/P drive value change is greater than the noise slew limit or the I/P drive value change is negative and the I/P drive value change is greater than the noise slew limit (block 714), the I/P drive value is changed based on the noise slew limit (block 716). In cases of a positive I/P drive value change, the I/P drive value is reduced to the previous I/P drive value plus the noise slew limit or reduced to a value less than the previous I/P drive value plus the noise slew limit. Similarly, in cases of a negative I/P drive value change, the I/P drive value is increased to the previous I/P drive value minus the noise slew limit or increased to a value greater than the previous I/P drive value minus the slew limit. The example method ends when the changed I/P drive value is transmitted as a current to the I/P converter 112 (block 718).

Figure 8:
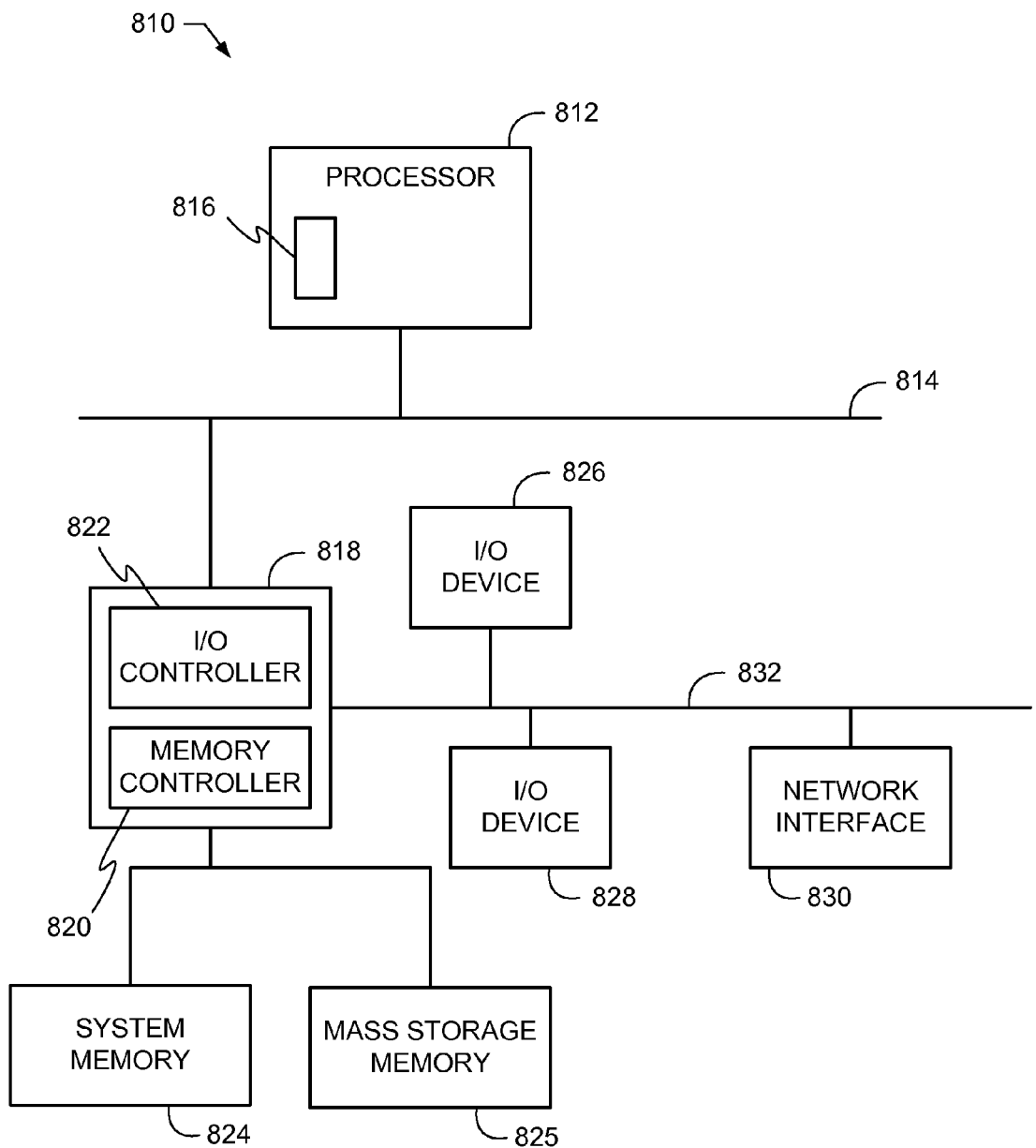
FIG. 8 is a block diagram of an example processor system that may be used to implement the example methods and apparatus described herein.

FIG. 8 is a block diagram of an example processor system 810 that may be used to implement the example methods and apparatus described herein. For example, processor systems similar or identical to the example processor system 810 may be used to implement the digital valve controller 104, the circuit board 108, the I/P drive current slew limiter 110, the noise detector 206, the servo control processor 208, and/or the microprocessor 210 of FIGS. 1 and/or 2. Although the example processor system 810 is described below as including a plurality of peripherals, interfaces, chips, memories, etc., one or more of those elements may be omitted from other example processor systems used to implement one or more of the digital valve controller 104, the circuit board 108, the I/P drive current slew limiter 110, the noise detector 206, the servo control processor 208, and/or the microprocessor 210.

As shown in FIG. 8, the processor system 810 includes a processor 812 that is coupled to an interconnection bus 814. The processor 812 includes a register set or register space 816, which is depicted in FIG. 8 as being entirely on-chip, but which could alternatively be located entirely or partially off-chip and directly coupled to the processor 812 via dedicated electrical connections and/or via the interconnection bus 814. The processor 812 may be any suitable processor, processing unit or microprocessor. Although not shown in FIG. 8, the system 810 may be a multi-processor system and, thus, may include one or more additional processors that are identical or similar to the processor 812 and that are communicatively coupled to the interconnection bus 814.

The processor 812 of FIG. 8 is coupled to a chipset 818, which includes a memory controller 820 and a peripheral input/output (I/O) controller 822. As is well known, a chipset typically provides I/O and memory management functions as well as a plurality of general purpose and/or special purpose registers, timers, etc. that are accessible or used by one or more processors coupled to the chipset 818. The memory controller 820 performs functions that enable the processor 812 (or processors if there are multiple processors) to access a system memory 824 and a mass storage memory 825.

The system memory 824 may include any desired type of volatile and/or non-volatile memory such as, for example, static random access memory (SRAM), dynamic random access memory (DRAM), flash memory, read-only memory (ROM), etc. The mass storage memory 825 may include any desired type of mass storage device. For example, if the example processor system 810 is used to implement the digital valve controller 104 (FIG. 1), the mass storage memory 825 may include a hard disk drive, an optical drive, a tape storage device, etc. Alternatively, if the example processor system 810 is used to implement the circuit board 108, the I/P drive current slew limiter 110, the noise detector 206, the servo control processor 208, and/or the microprocessor 210, the mass storage memory 825 may include a solid-state memory (e.g., a flash memory, a RAM memory, etc.), a magnetic memory (e.g., a hard drive), or any other memory suitable for mass storage in the circuit board 108, the I/P drive current slew limiter 110, the noise detector 206, the servo control processor 208, and/or the microprocessor 210.

The peripheral I/O controller 822 performs functions that enable the processor 812 to communicate with peripheral input/output (I/O) devices 826 and 828 and a network interface 830 via a peripheral I/O bus 832. The I/O devices 826 and 828 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface 830 may be, for example, an Ethernet device, an asynchronous transfer mode (ATM) device, an 802.11 device, a DSL modem, a cable modem, a cellular modem, etc. that enables the processor system 810 to communicate with another processor system.

While the memory controller 820 and the I/O controller 822 are depicted in FIG. 8 as separate functional blocks within the chipset 818, the functions performed by these blocks may be integrated within a single semiconductor circuit or may be implemented using two or more separate integrated circuits.

At least some of the above described example methods and/or systems are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols. For instance, each of the standards for internet and other packet-switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods, systems, and machine-accessible medium, the examples are not the only way to implement such systems, methods and machine-accessible medium. Therefore, although certain example methods, systems, and machine-accessible medium have been described herein, the scope of coverage of this patent is not limited thereto. On the contrary, this patent covers all methods, systems, and machine-accessible medium fairly falling within the scope of the appended claims either literally or under the doctrine of equivalents.

What is claimed is:

1. A method, comprising:
   determining a slew limit of a controller based on a characteristic of noise in at least one of a control signal or a feedback signal;
   calculating a drive value based on the control signal and the feedback signal;
   calculating a difference between the calculated drive value and a previous drive value;
   comparing the difference to the slew limit; and
   changing the calculated drive value if the difference is greater than the slew limit of the controller.

2. A method as defined in claim 1, further comprising transmitting the changed drive value to a transducer of the controller.

3. A method as defined in claim 1, wherein determining the slew limit comprises determining a first slew limit and changing the first slew limit based on a comparison of the noise to a threshold.

4. A method as defined in claim 1, wherein the slew limit is a maximum drive value change per execution cycle of a control process.

5. A method as defined in claim 1, wherein the control signal includes an instruction to set an actuator at a specified position, and wherein the feedback signal corresponds to a position of the actuator.

6. A method as defined in claim 1, wherein the previous drive value is a previously calculated value that was transmitted prior to receiving at least one of the feedback signal or the control signal.

7. A method as defined in claim 1, wherein determining the slew limit comprises calculating an average noise value.

8. A method as defined in claim 1, further comprising determining that at least one of an amplitude or an average value of the noise is greater than a threshold.

9. An apparatus, comprising:
   a noise detector to identify noise in at least one of a control signal or a feedback signal; and
   a drive current slew limiter to:
   determine a slew limit based on a characteristic of the noise;
   receive a drive value and a previous drive value;
   calculate the difference between the drive value and the previous drive value;
   compare the difference to the slew limit; and
   change the drive value if the difference is greater than the slew limit.

10. An apparatus as defined in claim 9, further comprising a position control processor to:

calculate from the control signal and the feedback signal a changed drive value and forward the changed drive value to the drive current slew limiter; and transmit the changed drive value to a transducer.

11. An apparatus as defined in claim 10, further comprising:
- a drive current generator to receive the changed drive value from the position control processor and generate a signal including the changed drive value to be sent to the transducer; and
- a memory to store at least one of the previous drive value, the drive value, or the slew limit for the drive current slew limiter.

12. An apparatus as defined in claim 11, wherein the memory is to store the slew limit as a maximum drive value change per execution cycle of a process.

13. An apparatus as defined in claim 11, wherein the drive current slew limiter is to store the previous drive value to the memory as a previously calculated drive signal that was transmitted prior to receiving at least one of the feedback signal or the control signal.

14. An apparatus as defined in claim 9, wherein the noise detector is to determine whether at least one of an amplitude or an average value of the noise is greater than a threshold.

15. An apparatus defined in claim 9, wherein the drive current slew limiter is to determine the slew limit based on a calculated average noise value.

16. An apparatus as defined in claim 9, wherein the drive current slew limiter is to determine the slew limit by determining a first slew limit and changing the first slew limit based on a comparison of the noise to a threshold.

17. An apparatus as defined in claim 9, wherein the feedback signal corresponds to a position of an actuator, and wherein the control signal includes an instruction to set the actuator at a specified position.

18. An apparatus, comprising:
- means for determining a slew limit of a controller based on a characteristic of noise in at least one of a control signal or a feedback signal;
- means for calculating a drive value based on the control signal and the feedback signal;
- means for calculating the difference between the calculated drive value and a previous drive value;
- means for comparing the difference to the slew limit; and
- means for changing the calculated drive value if the difference is greater than the slew limit of the controller.

19. An apparatus as defined in claim 18, further comprising means for transmitting the changed drive value to a transducer of the controller.

20. An apparatus as defined in claim 18, wherein the means for determining the slew limit comprises:
- means for determining a first slew limit; and
- means for changing the first slew limit based on the noise when the noise is greater than a threshold.

21. An apparatus as defined in claim 18, wherein determining the slew limit is based on a calculated average noise value.

22. An apparatus as defined in claim 18, further comprising means for determining that at least one of an amplitude or an average value of the noise is greater than a noise threshold.

* * * * *